United States Patent [19]

Wolbert et al.

[11] Patent Number: 4,603,463
[45] Date of Patent: Aug. 5, 1986

[54] IN SITU REPAIR OF A FAILED COMPRESSION FITTING

[75] Inventors: Ronald R. Wolbert, McKees Rocks; Walter G. Jandrasits, Pittsburgh, both of Pa.

[73] Assignee: The United States of America as represented by the Department of Energy, Washington, D.C.

[21] Appl. No.: 762,489

[22] Filed: Aug. 5, 1985

[51] Int. Cl.$^4$ .............................. B23P 6/00; B23P 6/04
[52] U.S. Cl. ............................... 29/402.07; 29/402.18; 29/557; 30/96; 408/203.5
[58] Field of Search ........... 29/402.07, 402.06, 402.05, 29/402.04, 402.18, 557; 408/203.5, 204, 206, 207; 30/93, 94, 95, 96

[56] References Cited

U.S. PATENT DOCUMENTS

| | | | |
|---|---|---|---|
| 1,255,304 | 2/1918 | Gairing | 408/203.5 |
| 2,477,482 | 7/1949 | Florin | 408/203.5 |
| 3,568,721 | 3/1971 | Ross et al. | 29/402.18 |
| 3,944,379 | 3/1976 | Elrod | 408/204 |
| 3,966,349 | 6/1976 | Osman et al. | 408/204 |
| 4,459,881 | 7/1984 | Hughes, Jr. | 408/206 |

Primary Examiner—Howard N. Golderg
Assistant Examiner—I. Golabi
Attorney, Agent, or Firm—Judson R. Hightower; Richard E. Constant

[57] ABSTRACT

A method and apparatus for the in situ repair of a failed compression fitting is provided. Initially, a portion of a guide tube is inserted coaxially in the bore of the compression fitting and locked therein. A close fit dethreading device is then coaxially mounted on the guide tube to cut the threads from the fitting. Thereafter, the dethreading device and guide tube are removed and a new fitting is inserted onto the dethreaded fitting with the body of the new fitting overlaying the dethreaded portion. Finally, the main body of the new fitting is welded to the main body of the old fitting whereby a new threaded portion of the replacement fitting is precisely coaxial with the old threaded portion. If needed, a bushing is located on the dethreaded portion which is sized to fit snugly between the dethreaded portion and the new fitting. Preferably, the dethreading device includes a cutting tool which is moved incrementally in a radial direction whereby the threads are cut from the threaded portion of the failed fitting in increments.

9 Claims, 4 Drawing Figures

IN SITU REPAIR OF A FAILED COMPRESSION FITTING

FIELD OF THE INVENTION

The present invention relates generally to the repair of a failed compression fitting, and more particularly to the in situ repair of a failed compression fitting which requires precise axial alignment of the fitting and penetration bores.

BACKGROUND OF THE INVENTION

A potentially critical problem that may occur in high temperature and pressure power plant components is a leak type failure in the threaded closure portion of a welded on compression fitting. Such failures may be caused by galled or corroded threads, sheared off threads, extensive pit-type corrosion between the ferrule and fitting body, or cross-threading of the closure nut onto the body threads. Each failure of this type requires a replacement type repair of the fitting.

The problem of repairing a fitting of this type is intensified when the fitting is part of a precision type nozzle penetration for instrumentation when said such fitting is welded to a large immobile component such as a steam generator and which is located in a relatively inaccesible position. One of the major difficulties to be overcome with this type of problem is maintaining precise bore alignment between the existing nozzle run and the new replacement fitting without the aid of precision machine shop equipment.

In the piping field, various devices have been disclosed for working the end of a pipe. For example, in U.S. Pat. No. 2,744,269, (Kerr et al), a pipe threading die head assembly is disclosed. This assembly includes a pipe-grasping arbor which carries a sleeve of rubber or other suitable material which expands to grasp the interior surface of a pipe as a plug is drawn into the sleeve. Other pipe threading devices are disclosed in U.S. Pat. No. 1,231,743 (Johnston) and U.S. Pat. No. 2,757,393 (Galloway). The former patent includes an expandable member for tightly gripping the inside diameter of a pipe during cutting while the latter discloses a tight fitting mandrel for the inside diameter of a pipe.

Other prior art devices have also been disclosed for performing various operations on pipes. For example, in U.S. Pat. No. 2,749,803 (Anderson), an apparatus for trimming tube ends is disclosed. This apparatus includes a clamping means having two conical plugs located inside of the tube and a split ring wedge which is moved against the conical enlargement to clamp the apparatus to the tube. In U.S. Pat. No. 2,453,848 (Livingston et al), a facing tool for tubes is disclosed including expanding sections between wedging sections located inside of the tube. A cutter is manually rotated using a handle and a feeding wheel to appropriately face the pipe. A cutting tool for facing tubing to a desired length including a mandrel inserted within the tube is disclosed in U.S. Pat. No. 3,532,010 (Klintworth). A sloted tube holder is also disclosed in U.S. Pat. No. 1,336,466 (Lam).

SUMMARY OF THE INVENTION

In accordance with the present invention, a method and apparatus for the in situ repair of the failed compression fitting is provided. The repair of the failed compression fitting is accomplished by inserting a portion of a guide tube coaxially in the bore of the fitting. The guide tube in then locked coaxially in the bore so that a portion of the guide tube extends coaxially from the fitting. A close fit dethreading device is then coaxially slid onto the portion of the guide tube and against the threads of the fitting. The threads of the fitting are then cut from the fitting using the dethreading device. Thereafter, the dethreading device and guide tube are removed from the dethreaded fitting. A new fitting is then inserted onto the dethreaded fitting with the body of the new fitting overlaying the dethreaded portion. Finally, the main body of the new fitting is welded to the main body of the old fitting so that the threaded portion of the new replacement fitting is precisely coaxial with the old threaded portion.

Preferably, the dethreading device includes a guide bushing which is coaxially received on the guide tube in a close sliding fit in order to precisely align the dethreading device coaxial with the guide tube. A cutting tool is provided in the dethreading device which extends radially for cutting the threads from the fitting as the dethreading device is rotated and advanced. An adjusting means is also provided for adjusting the cutting tool radially according to the heights of the threads on the fitting to be cut. With this construction, the threads on the failed compression fitting are incrementally cut from the fitting. Preferably, the dethreaded portion is polished to a smooth surface prior to insertion of the new fitting. A bushing can also be inserted on the dethreaded portion which is sized to fit snugly between the dethreaded portion and the new fitting as necessary.

In the preferred embodiment, the guide tube includes a tapered ferrule located inwardly along the guide tube and tapered toward a distal end of the guide tube which is inserted in the fitting. A plurality of slots are also provided in the guide tube extending from the ferrule to the distal end. An expander is also located in the distal end. In order to lock the guide tube to the fitting, the guide tube is inserted until the tapered ferrule positively engages the fitting. The distal end of the guide tube is then expanded using the expander until the distal end of the guide tube is securely held against the fitting. Preferably, the expander means includes a tapered head which is in engagement with the distal end of the guide tube and tapered so as to extend inwardly of the distal end. A threaded rod is attached to the tapered head and extends through the guide tube and out of the proximal end. A nut is then located on the threaded rod extending from the proximal end which nut is also in contact with the proximal end of the guide tube. In this manner, rotation of the nut causes the tapered head to be drawn in a camming motion further into the guide tube to thereby expand the distal end of the guide tube outwardly in the bore of the fitting.

In the preferred embodiment, the dethreading device further includes a guide body to which the guide bushing is mounted. A cylindrical flange extends from the guide body to a free end so that the flange is coaxial with the guide tube. The cutting tool is also mounted in the cylindrical flange and an access slot is provided in the cylindrical flange adjacent the cutting tool. A spread plate having a central aperture coaxial with the guide tube is attached over the free end of the cylindrical flange to prevent the free end from spreading.

It is an advantage of the present invention that the in situ repair of a failed compression fitting which requires precise alignment of the fitting and penetration bores is provided. The present invention is particularly suited for repair of compression fittings (such as SWAGE- LOK) on many components (such as a steam generator) that cannot be moved to a machine shop.

It is also an advantage of the present invention that an efficient, inexpensive, and remarkably simple means of effecting a repair of a defective fitting is provided. In particular, all required machinery operations are accomplished by hand operations only so that no electrical power is necessary. Precise machine alignment is provided with a simple expandable mandrel by making use of the existing penetration bore as a reference surface.

It is a further advantage of the present invention that the weld joint configuration of the replacement fitting to the failed fitting is ASME code acceptable. This final weld joint configuration is classified as a full penetration weld with an integral backing ring.

Still another advantage of the present invention is that it is efficient. The total procedure is easily accomplished in a matter of hours.

Yet another advantage of the present invention is that the possibility of dirt, cutting chips, and other foreign matter entering the penetration is minimized by the presence of the guide tube in the penetration during cutting and by the fact that a complete machining process is not needed.

It is a feature of the present invention that the dethreading device required is simply constructed and uses a ¼" square lathe cutting element as the cutting tool.

It is also a feature of the present invention that the hand-operated dethreading and turning tool establishes a reference control surface on the failed fitting on which a replacement fitting is inserted and then welded in place. In this manner, the replacement fitting is exactly aligned with the failed fitting.

It is a further feature of the present invention that the tools used are very compact in nature and adapted for hand operation in a confined area or access region.

Other features and advantages of the present invention are stated in or apparent from a detailed description of a presently preferred embodiment of the invention found hereinbelow.

DETAILED DESCRIPTION OF THE PREFERRED EMBODIMENT

Figure 1:
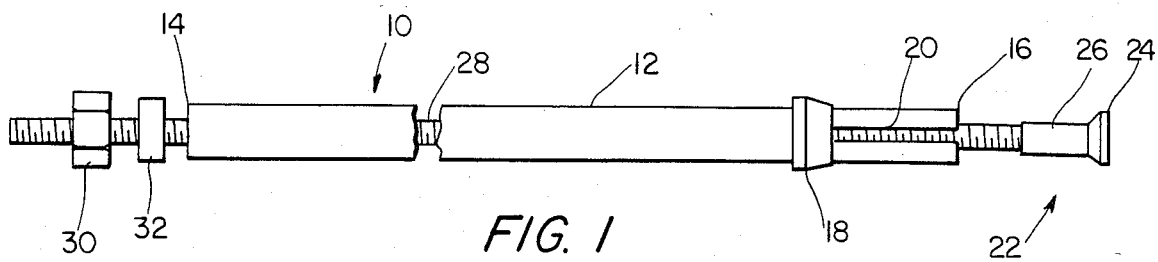
FIG. 1 is a side elevation view of the guide tube of the present invention.

With reference now to the drawings in which like numerals represent like elements throughout the several views, a guide mandrel 10 is depicted in FIG. 1. Guide mandrel 10 includes a guide tube 12 having a proximal end 14 and a distal end 16. A tapered ferrule 18 is located about guide tube 12 adjacent distal end 16. As shown, ferrule 18 tapers toward distal end 16. A pair of slots 20 are provided in guide tube 12. Slots 20 extend from ferrule 18 to distal end 16.

Located in guide tube 12 is an expander means 22. Expander means 22 includes a tapered head 24 at distal end 16 of guide tube 12. Tapered head 24 includes a reduced portion 26 which is received inside of distal end 16. Distal end 16 includes an inside taper 27 which matingly engages tapered head 24. A threaded rod 28 is provided which is attached to reduce portion 26 and which extends through guide tube 12 and out of proximal end 14. A nut 30 is provided on the end of threaded rod 28 extending from proximal end 14. Preferably, a thrust collar 32 is provided on threaded rod 28 between nut 30 and proximal end 14 as shown.

Figure 2:
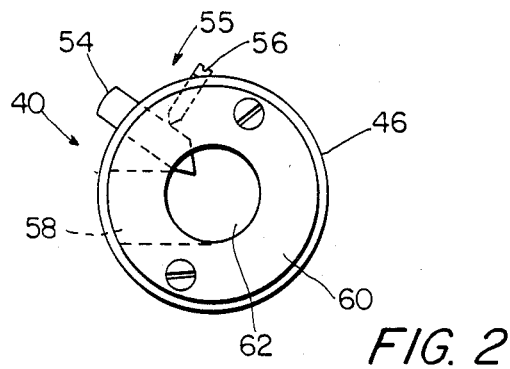
FIG. 2 is a front elevation view of the dethreading device of the present invention.
Figure 3:
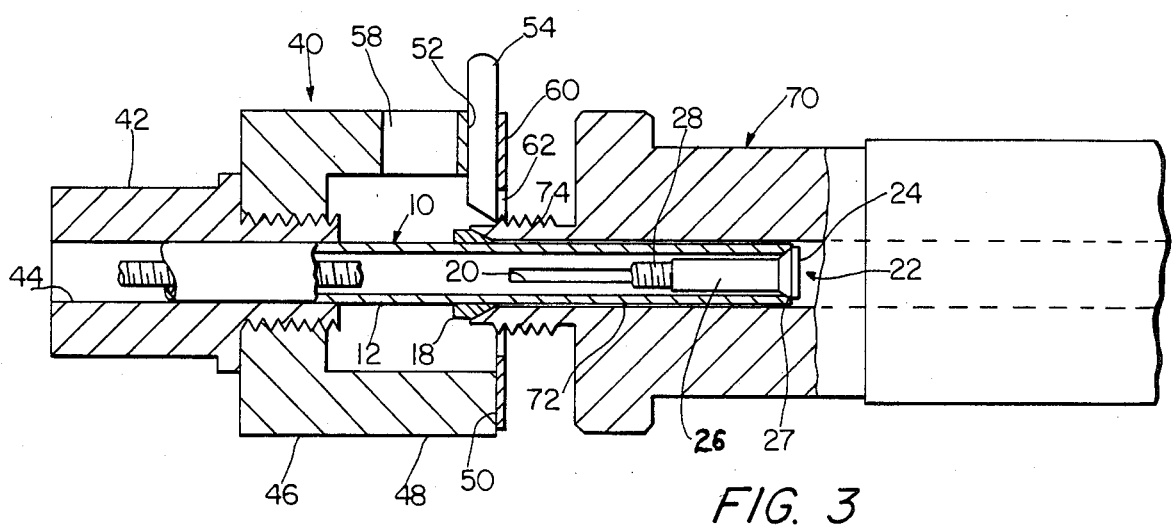
FIG. 3 is a cross-sectional side elevation view of the dethreading device and guide tube of the present invention in position relative to a failed compression fitting.

Depicted in FIGS. 2 and 3 is a dethreading device 40. Dethreading device 40 includes a guide bushing 42 having a bore 44. Bore 44 is sized to receive guide tube 12 therein in a close sliding fit as shown in FIG. 3.

Dethreading device 40 also includes a guide body 46 to which guide bushing 42 is mounted. A cylindrical flange 48 extends from guide body 46 to a free end 50. As shown, cylindrical flange 48 is coaxial with guide tube 12 when guide tube 12 is received in guide bushing 42. Cylindrical flange 48 is provided with an aperture 52 in which a cutting tool 54 is located. Preferably, cutting tool 54 is a ¼" square lathe cutting tool. An adjusting means 55 is provided by which cutting tool 54 is slidably mounted in aperture 52 in a radial direction. Adjusting means 55 includes a set screw 56 which extends at right angles to cutting tool 54 through cylindrical flange 48 by which cutting tool 54 is locked in aperture 52. An access slot 58 is also provided in cylindrical flange 48 as shown. Mounted on free end 50 of cylindrical flange 48 is a spread plate 60. Spread plate 60 has a central aperture 62 through which guide tube 12 extends. Spread plate 60 is used to prevent cylindrical flange 48 from spreading.

Figure 4:
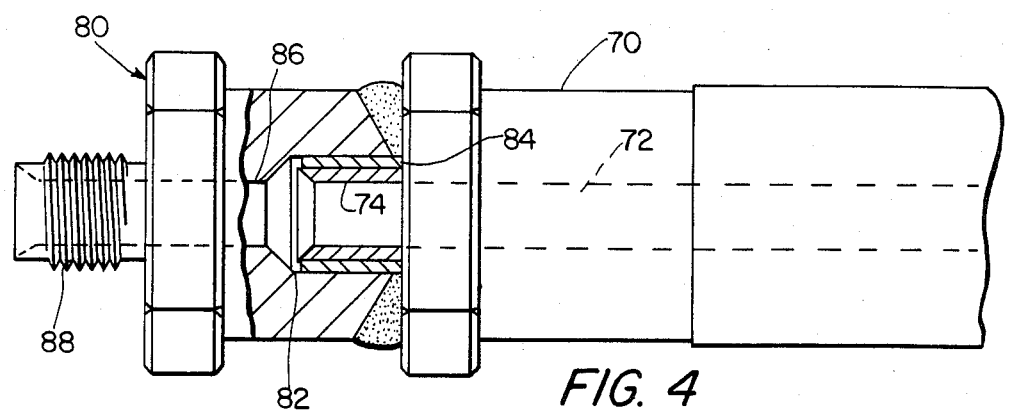
FIG. 4 is a partially cutaway side elevation view of a new replacement fitting attached to a failed compression fitting according to the present invention.

Depicted in FIGS. 3 and 4 is a failed compression fitting 70. Failed compression fitting 70 includes a bore 72 which is precisely coaxially aligned with a penetration bore or the like. Compression fitting 70 also includes a threaded coupling 74 as shown.

In operation, failed compression fitting 70 is repaired as follows. Initially, dethreading device 40 is mounted on guide tube 12 with cylindrical flange 48 nearest ferrule 18. This is accomplished with nut 30 and thrust collar 32 removed so that guide bushing 42 is easily received on guide tube 12 in a close, sliding fit. Thereafter, thrust collar 32 and nut 30 are located on threaded rod 28. Distal end 16 of guide tube 12 is then inserted in bore 72 of failed compression fitting 70 until tapered ferrule 18 contacts the matingly tapered portion of threaded coupling 74 as shown in FIG. 3. Guide tube 12 is then locked in place in bore 72 by advancing nut 30 toward proximal end 14. This causes threaded rod 28 to be moved longitudinally in guide tube 12 so as to draw reduced portion 26 and matingly tapered head 24 of expander means 22 into distal end 16 of guide tube 12. As this occurs, the camming action between the mating tapers of tapered head 24 and inside taper 27 of distal end 16 causes distal end 16 to move radially outwards and be clamped in bore 72. It should be appreciated that the provision of slots 20 facilitates the radial expansion of distal end 16 to this locking position. At this time, guide tube 12 is therefore precisely coaxially aligned with bore 72 and hence the penetration bore associated therewith.

Next, dethreading device 40 is used to cut the threads from threaded coupling 74 of failed compression fitting 70. To accomplish this, cutting tool 54 is initially adjusted so that the cutting edge just contacts the threads of threaded coupling 74. This is accomplished by loosening set screw 56 of adjusting means 55 and moving cutting tool 54 appropriately in aperture 52. A spare fitting similar to failed compression fitting 70 and a piece of tubing similar to guide tube 12 can be useful in setting the initial cutting height of cutting tool 54 before insertion on guide tube 12. In addition, a micrometer spanning the back of the cutter head to the end of the cutting tool is useful for controlling the initial and subsequent depths of cut.

Dethreading device 40 is then rotated and advanced along guide tube 12 to take light cuts from the threads on threaded coupling 74. Dethreading device 40 is easily turned by hand and advanced to progressively remove the threads on threaded coupling 74. Multiple passes at a particular setting are recommended to insure complete removal of metal at the set cutter depth. Thereafter, cutting tool 54 is adjusted inward slightly so that another approximately 10 to 15 mils are cut from threaded coupling 54 as dethreading device 40 is rotated and advanced. This process of adjusting cutting tool 54 and removing additional portions of the thread on threading coupling 74 is repeated until the root diameter of threaded coupling is reached. Emery cloth is also preferably used to remove any small burrs that remain on threaded coupling 74. At this time, a control surface on threaded coupling 74 which is exactly concentric to bore 72, and which has a surface texture generally less than 125 microinches is provided.

After threaded coupling 74 is dethreaded, nut 30 is rotated in the opposite direction to release tapered end 24 from distal end 16. This unlocks guide mandrel 10 from bore 72. Guide tube 12 and dethreading device 40 are then removed from failed compression fitting 70.

After removal of guide tube 12, the diameter of the surface of threaded coupling 74 is precisely measured. An appropriate replacement compression fitting 80 is then chosen which has a receiving bore 82 which fits around the surface of threaded coupling 74. Ideally, receiving bore 82 is a snug fit with the surface of threaded coupling 74. However, if this is not possible, a bushing 84 is located around the surface of threaded coupling 74 which is a snug fit around the surface of threaded coupling 74 and which is also a snug fit in receiving bore 82 of replacement compression fitting 80.

After replacement compression fitting 80 is snugly located on the surface of threaded coupling 74, bore 86 of replacement fitting 80 is precisely coaxially aligned with bore 72 of failed compression fitting 70. This precise alignment is accomplished by the precise concentric nature of the surface of threaded coupling 74. Thereafter, replacement compression fitting 80 is welded to failed compression fitting 70 using the appropriate weld procedure as shown in FIG. 4. This effects repair of the compression fitting 70 as replacement compression fitting 80 has a new threaded coupling 88 to be used in place of threaded coupling 74 of failed compression fitting 70.

It should be appreciated that after replacement compression fitting 80 is welded to failed compression fitting 70, the location of threaded coupling 88 is moved laterally relative to threaded coupling 74 which was previously provided. However, the displacement distance is less than the length of replacement compression fitting 80. In most instances, only a minor adjustment need be made, if any, to the device which was formerly attached to threaded coupling 74 and which is now to be attached to threaded coupling 88. However, the exact coaxial alignment of bores 86 and 72 is maintained which is often the critical factor.

Although the present invention has been described with respect to an exemplary embodiment thereof, it will be understood by those of ordinary skill in the art that variations and modifications can be effected within the scope and spirit of the invention.

We claim:

1. A method for the in situ repair of a failed compression fitting comprising the steps of:
    inserting a portion of a guide tube coaxially in the bore of the fitting;
    locking the guide tube coaxially in the bore of the fitting such that a portion of the guide tube extends coaxially from the fitting;
    sliding a close fit dethreading device coaxially on the portion of the guide tube against the threads of the fitting;
    cutting the threads from the fitting using the dethreading device;
    removing the dethreading device and guide tube from the dethreaded fitting;
    inserting a new fitting onto the dethreaded fitting with the body of the new fitting overlaying the dethreaded portion; and
    welding the main body of the new fitting to the main body of the old fitting whereby the new threaded portion of the new replacement fitting is precisely coaxial with the old threaded portion.

2. A method for repairing a failed fitting as claimed in claim 1 wherein said cutting step includes the turning and advancing of the dethreading device to cut a portion of the threads from the threaded portion, moving a cutting tool of the dethreading device incrementally in a radial direction, and repeating the turning-advancing and moving steps to incrementally cut the threads from the threaded portion of the fitting.

3. A method for repairing a failed fitting as claimed in claim 1 and further including the step of polishing the dethreaded portion to a smooth surface prior to the step of inserting the new fitting.

4. A method for repairing a failed fitting as claimed in claim 1 and further including the step of inserting a bushing onto the dethreaded portion which is sized to fit snuggly between the dethreaded portion and the new fitting.

5. A method for repairing a failed fitting as claimed in claim 1 wherein the guide tube includes a tapered ferrule located inwardly along the guide tube and tapered toward a distal end of the guide tube inserted in the fitting, a plurality of slots in the guide tube extending from the ferrule to the distal end, and an expander located in the distal end; and wherein the locking of the guide tube step includes the steps of: inserting of the guide tube until the tapered ferrule positively engages the fitting, and expanding the distal end of the guide tube with the expander until the distal end of the guide tube is securely held against the fitting.

6. An apparatus for the in situ repair of a failed compression fitting comprising:
    a guide mandrel which is precisely coaxially aligned with the base of the fitting including
    a. a guide tube having a distal end which is inserted in the base of the fitting and a proximal end which extends from the fitting, said guide tube being sized to closely fit within the bore,
    b. a tapered ferrule which is located about said guide tube adjacent said distal end and tapering toward said distal end for engaging the end of the fitting, c. a plurality of slots in said guide tube extending longitudinally from said ferrule to said distal end, and d. an expander means for expanding the distal end of said guide tube to lock said distal end in the bore of the fitting; and a dethreading device which is coaxially received on said guide tube, said dethreading device including a. a guide bushing which is coaxially received on said guide tube in a close sliding fit in order to precisely align said dethreading device coaxial with said guide tube, b. a cutting tool which extends radially for cutting the threads from the fitting as said dethreading device is rotated, and c. an adjusting means for adjusting said cutting tool radially according to the height of the threads on the fitting to be cut.

7. An apparatus for repairing a failed fitting as claimed in claim 6 wherein said expander means includes: a tapered head in engagement with said distal end of said guide tube and tapered so as to extend inwardly of said distal end; a threaded rod which is attached to said tapered head and which extends through said guide tube and out said proximal end; and a nut located on said rod extending from said proximal end of said guide tube and in contact with said proximal end of said guide tube such that rotation of said nut causes said tapered head to be drawn in a camming motion further into said guide tube and thereby expand said distal end of said guide tube outwardly in the bore of the fitting.

8. An apparatus for repairing a failed fitting as claimed in claim 7 wherein said distal end of said guide tube is matingly tapered with said tapered head.

9. An apparatus for repairing a failed fitting as claimed in claim 6 wherein said dethreading device further includes a guide body to which said guide bushing is mounted, a cylindrical flange extending from said guide body to a free end with said flange coaxial with said guide tube and in which said cutting tool is mounted, an access slot in said cylindrical flange adjacent said cutting tool, and a spread plate having a central aperture coaxial with said guide tube and attached over the free end of said cylindrical flange to prevent the free end from spreading.

* * * * *